Sept. 3, 1968 P. RAINGER ET AL 3,400,211

TELEVISION STANDARDS CONVERSION

Filed Nov. 16, 1964 10 Sheets-Sheet 1

T5055

INVENTORS
Peter Rainger
Robin Evan Davies
BY Lemon, Palmer
Stewart & Estabrook
ATTORNEYS INVENTORS
Peter Rainger
Robin Evan Davies
BY Kemon, Palmer, Stewart & Estabrook
ATTORNEYS INVENTORS
Peter Rainger
Robin Evan Davies
BY Kemon, Palmer, Stewart & Estabrook
ATTORNEYS INVENTORS
Peter Rainger
Robin Evan Davies
BY Kemon, Palmer, Stewart & Estabrook
ATTORNEYS INVENTORS
Peter Rainger
Robin Evan Davies
BY Kemon, Palmer, Stewart & Estabrook
ATTORNEYS INVENTORS
Peter Rainger
Robin Evan Davies
BY Kemon, Palmer, Stewart & Estabrook
ATTORNEYS

TELEVISION STANDARDS CONVERSION

Filed Nov. 16, 1964 10 Sheets-Sheet 7

INVENTORS
Peter Rainger
Robin Evan Davies
BY Kemon, Palmer, Stewart & Estabrook
ATTORNEYS INVENTORS
Peter Rainger
Robin Evan Davies
BY Kemon, Palmer,
Stewart & Estabrook
ATTORNEYS INVENTORS
Peter Rainger
Robin Evan Davies
BY Kemon, Palmer, Stewart & Estabrook
ATTORNEYS INVENTORS
Peter Rainger
Robin Evan Davies
BY Kemon, Palmer, Stewart & Estabrook
ATTORNEYS 3,400,211
TELEVISION STANDARDS CONVERSION Peter Rainger, Pinner, Middlesex, and Robin Evan Davies, Horley, Surrey, England, assignors to The Marconi Company Limited, and Standard Telephones & Cables Limited, both of London, England, both British companies Filed Nov. 16, 1964, Ser. No. 411,398
Claims priority, application Great Britain, Nov. 18, 1963, 45,506/63; Dec. 6, 1963, 48,370/63
26 Claims. (Cl. 178—6.8)

ABSTRACT OF THE DISCLOSURE

Apparatus for generating from an input television signal an output television signal having a different line or field repetition frequency, in which the input signal is fed to a variable delay circuit, the delay of which is progressively varied from one extreme value (maximum or minimum) to the other during a time interval substantially equal to a small integral multiple of the period of the beat frequency between the input and output line or field frequencies, as the case may be, and then returned directly to the first said extreme value, the difference between the two extreme values of the delay being such that at the end of the said time interval, either a small number of input lines or fields are discarded from the input signal or a small number of lines or fields are repeated in the output signal.

Figure 1:
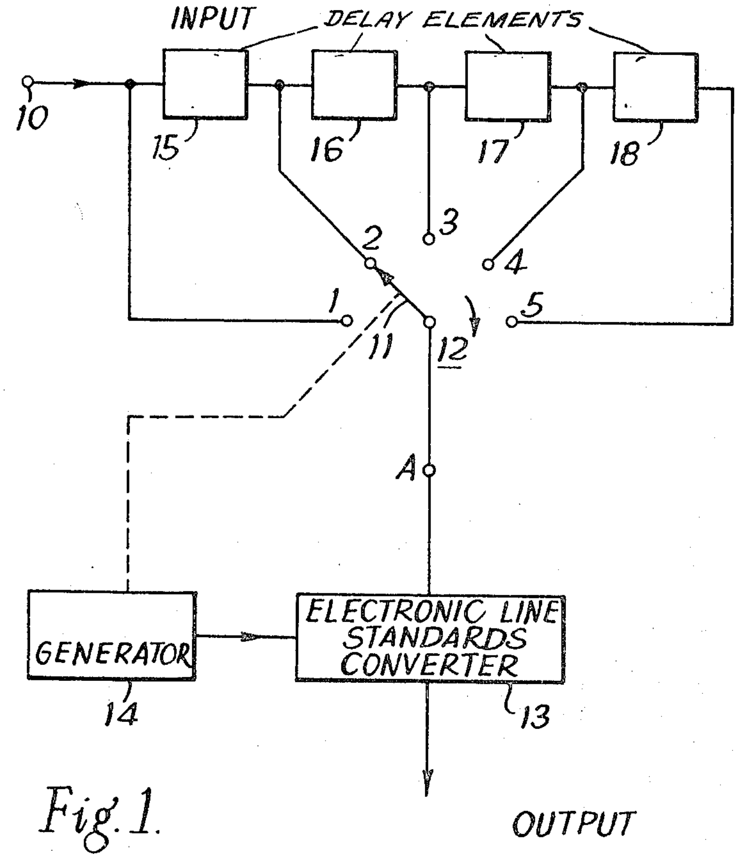

The present invention relates to the conversion of television signals from one field repetition frequency to another, and from one line repetition frequency to another.

According to the present invention there is provided apparatus for converting a television signal from one field repetition frequency to another, or from one line repetition frequency to another, by generating from an input television signal an output television signal having a different field or line repetition frequency respectively, the apparatus comprising a variable delay circuit, to which, in operation, the input signal is to be applied, and the delay of which can be varied between two extreme values, namely a maximum value and a minimum value, and means for varying the delay of the delay circuit from one of the said extreme values to the other during a time interval substantially equal to a small integral multiple of the period of the best frequency between the input and output field frequences (in the case of field frequency conversion) or between the input and output line frequencies (in the case of line frequency conversion), and for returning the delay, at the end of the said time interval, directly to the said one extreme value, the difference between the said maximum and minimum delay values being such that, in operation, at the end of the said time interval, a small integral number of output fields (in the case of field frequency conversion) or output lines (in the case of line frequency conversion) are repeated in the output signal, or a small integral number of input fields (in the case of field frequency conversion) or input lines (in the case of line frequency conversion) are discarded from the input signal.

By a small integral multiple of any value is meant a multiple of one, two, three or four times that value, and by a small integral number is meant any of the numbers one, two, three or four.

When converting from a higher to a lower field or line repetition frequency (in the cases of field and line frequency conversion respectively) the delay introduced by the delay circuit is progressively increased from the minimum to the maximum value during the said time interval, and a number of input fields or lines are discarded at the end of each of the said time intervals.

When converting from a lower to a higher field or line repetition frequency (as the case may be) the delay introduced by the delay circuit is progressively decreased from the maximum to the minimum value during the said time interval, and a number of output fields or lines are repeated in the output signal at the end of each of the said time intervals.

In the case of field frequency conversion, the line repetition frequencies of the input and output signals will not normally differ, although the number of lines per field in the input and output signals may or may not differ according to the manner in which the invention is carried out. Any change between input and output line periods which may be required is normally carried out by additional elements included in the apparatus. It is possible, however, in some embodiments of the invention (for example in the apparatus to be described hereinafter with reference to FIG. 12) to carry out conversion of both field and line repetition frequencies. Where field and line repetition frequency conversion take place together, the line frequency conversion, although in some cases valuable, is regarded as incidental to the field frequency conversion, and thus the beat frequency referred to in the last paragraph is taken to be equal to the difference between the input and output field frequencies, and not between the input and output line frequencies.

In several preferred constructions of the invention, the minimum value of the variable delay circuit is substantially zero, and the maximum value is equal to one input field or line period (in the cases of field or line frequency conversion respectively). Also the time interval during which the delay of the delay circuit is varied from one of the extreme values to the other (which, together with the direct return to the first extreme value, can be regarded as one cycle of conversion) is preferably equal to the period of the beat frequency referred to. At the end of each conversion cycle is these preferred constructions, one field or line (according to whether field or line frequency conversion is taking place) is discarded from the input signal or repeated in the output signal.

In one construction of the invention, the delay introduced by the delay circuit may be varied in discrete units of delay which are substantially equal to the difference between the input and output field or line periods (in the cases of field and line frequency conversion respectively). The delay introduced is changed by one discrete delay unit at regular time intervals equal to one output field or line period as the case may be.

In another construction of the invention the delay introduced by the delay circuit is varied continuously by the said varying means.

In a further construction of the invention for converting a television signal from one field repetition frequency to another, the delay introduced by the delay circuit is varied in discrete units of delay each equal to an input line period. The delay introduced is changed by one input line period at regular time intervals so that there are discarded from the input signal or repeated in the output signal a number of lines which are evenly distributed throughout each field of the input or output signal respectively.

This further construction of the invention may be modified for converting a television signal from one line repetition frequency to another, the delay of the delay circuit being varied in discrete units of delay each equal to a small integral multiple of a fraction of the duration of a picture element, the fraction being equal to the difference between the input and output line periods divided by the input line period. A picture element of a television signal is half the duration of one cycle of the nominal highest frequency contained in the signal. The delay introduced by the delay circuit is changed at regular time intervals so that there are discarded from the input signal or repeated in the output signal a number of picture elements which are evenly distributed throughout each line of the input or output signal respectively.

In yet a further construction of the invention there is provided apparatus for converting a television signal from one field repetition frequency and one line repetition frequency, to another field repetition frequency and another line repetition frequency, by generating from an input television signal an output television signal having field and line repetition frequencies which differ from those of the input signal, in which apparatus the delay introduced by the delay circuit is variable by the said varying means in discrete delay units substantially equal to the difference between an input and an output line period, the delay introduced by the delay circuit being changed, in operation, by one discrete delay unit at regular time intervals equal to one output line period.

In the constructions referred to, other than that in which the delay circuit is continuously variable, the delay circuit may comprise a number of delay elements having different fixed delay values, the lowest fixed delay value being equal to the said discrete delay unit, and the other fixed delay values being equal to multiples of the lowest value with increasing integral powers of the number 2, the said varying means varying the delay introduced by the delay circuit in the said discrete delay units by feeding the input signal through different combinations of the delay elements.

When converting from one field frequency to another it is preferred to include in the apparatus one or more line standards converters for restoring the aspect ratio of the output signal and for interpolating between lines when input lines are discarded or output lines repeated.

The line standards converters referred to are preferably electronic line-standards converters of the types described in British patent specifications Nos. 928,730 and 966,318.

In British patent specification No. 928,730 there is described a television standards converter comprising a plurality of element-stores, equal in number to the number of elements into which a line of an input signal is to be resolved, means for writing into the stores, at the input line frequency, the information belonging to each input line, and means for reading the information from the stores at a output line frequency.

If the rasters of input and output fields carrying the same information are superimposed, the input and output lines do not coincide over most of their length. Hence provision must be made for adding together proportions of adjacent input lines in order to provide information suitable for output lines which, for most of their length, fall between input lines. The process of combining information from two or more lines of a given raster to provide information belonging to a resultant line which, over most of its length, does not coincide with the lines of the given raster, is known as interpolation.

One form of the standards converter described in British patent specification No. 928,730 includes two rotary switches, each comprising a circle of studs and a wiper which can be rotated to sweep over the studs and make electrical contact with each in turn. Each of the studs on a first of the rotary switches is connected through an element-store individual to the stud to a corresponding stud on the second rotary switch, the studs on the second switch being grouped in the same order as those on the first. Each line of the input signal is written into the stores by the wiper of the first rotary switch rotating at the input line repetition frequency and each line of the output signal is read from the stores by the wiper of the second rotary switch rotating at the output line repetition frequency. In practice, electronic switching circuits are used to carry out the conversion, but in describing some aspects of the present invention reference will be made, for simplicity, to mechanical rotary switches. In the apparatus of patent specification No. 928,730, each of the element-stores consists of a low-pass filter.

In British patent specification No. 966,318 there is described an alternative standards converter in which the low-pass filters are replaced by simple element-stores such as capacitors. These stores merely receive information at the studs of the first switch, store the information, and provide the same information to be read at the studs of the second switch. The step of combining information from adjacent input lines in varying proportions is carried out, not in the stores themselves, but by means of suitable circuits by which a signal is processed before it is fed to the stores.

If the line periods of the input and final desired output standards are not substantially the same it will be appreciated that a separate line standards converter is necessary. If, as is the case with 625/50 and 525/60 standards the line frequencies are substantially the same, a slight delay adjustment can deal with the discrepancy.

The delay elements may also be used either to repeat one input field or line by giving it additional delay or to recirculate one output field or line through the delay circuit, when an additional field or line is to be added to the outgoing signal.

The delay circuit may require unwanted lines to be already blanked out before the incoming signal is applied to the delay circuit input, or it may be necessary to apply lines which are to be duplicated to a separate input. These functions are readily carried out by a switching circuit which may also be arranged to effect an interpolation procedure in order to avoid making sloping lines in the picture ragged.

The delay elements may be conventional delay lines or they may be circuits which include apparatus for recording and reading back signals from a magnetic drum or disc.

Keying pulses may be inserted between groups of lines to operate the switches controlling the delay elements.

Certain constructions according to the invention are particularly advantageous for converting from television signals having 625 lines per picture and 50 fields per second (referred to herein as 625/50 signals) to television signals having 525 lines per picture and 60 fields per second (525/60 signals) and vice-versa. In such signals each picture consists of two interlaced fields. Certain constructions of the invention are particularly applicable to field conversion between these standards, because the ratio of the numbers of lines per picture in the two standards is approximately equal to the inverse of the ratio of the field frequencies. The line periods in the two systems are approximately the same. Thus, when the number of lines repeated or discarded during conversion is made of the correct magnitude to allow every sixth input field to be discarded or every fifth output field to be repeated, it is found that the number of lines in each output field has been brought very nearly to the number required by the output standard. Only a small further processing of the signal is required to bring the number of output lines per field to exactly the required number.

If the ratio of the numbers of lines per picture is not approximately the same as the inverse of the ratio of the field frequencies, separate line standards conversion is necessary in addition to the actual process of field frequency conversion.

Figure 2:
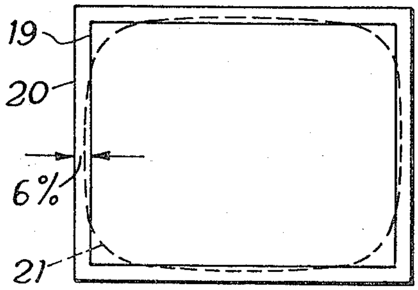
Figure 3:
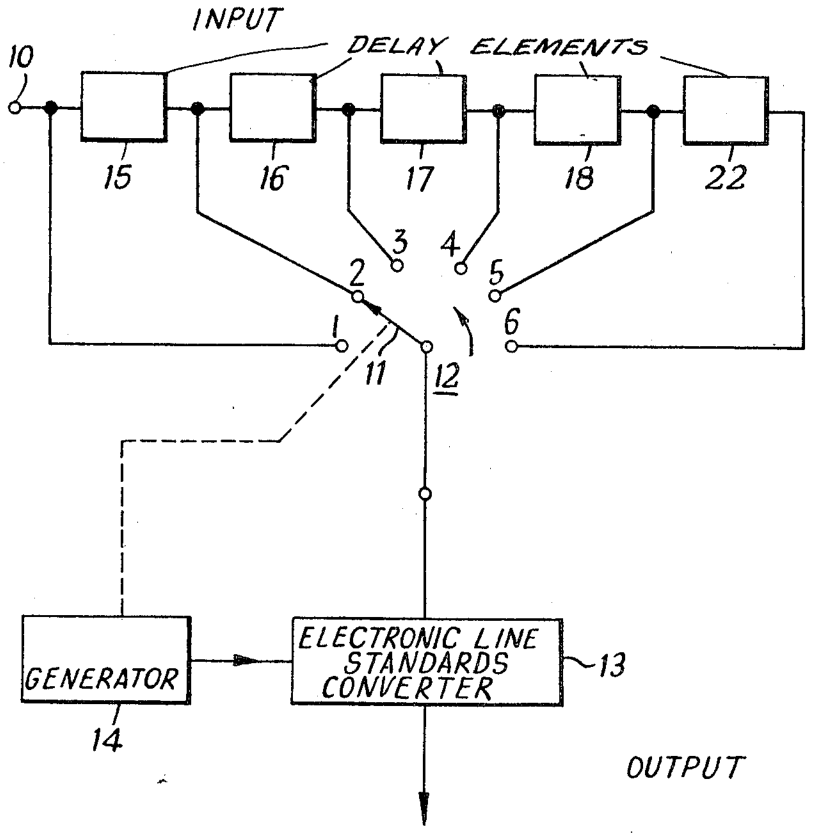
Figure 4A:
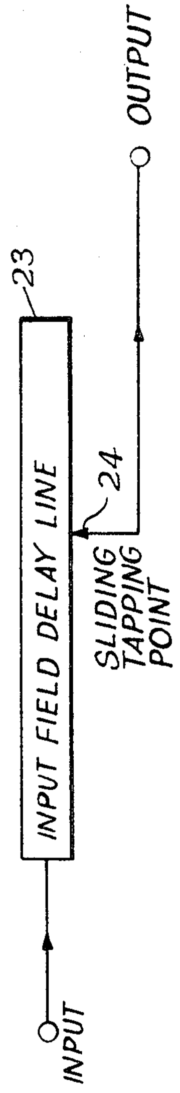
Figure 4B:
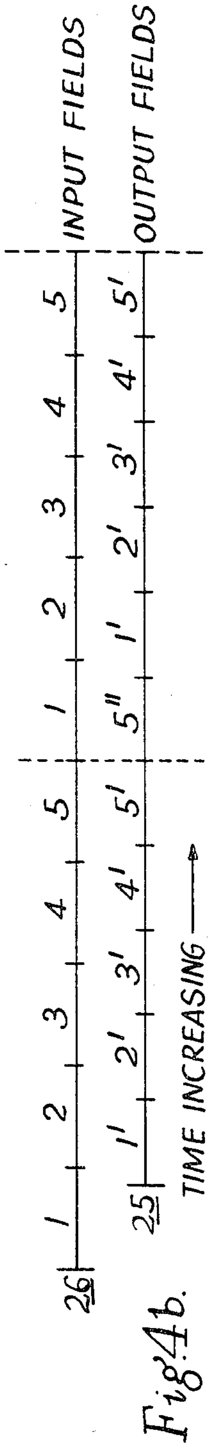
Figure 5A:
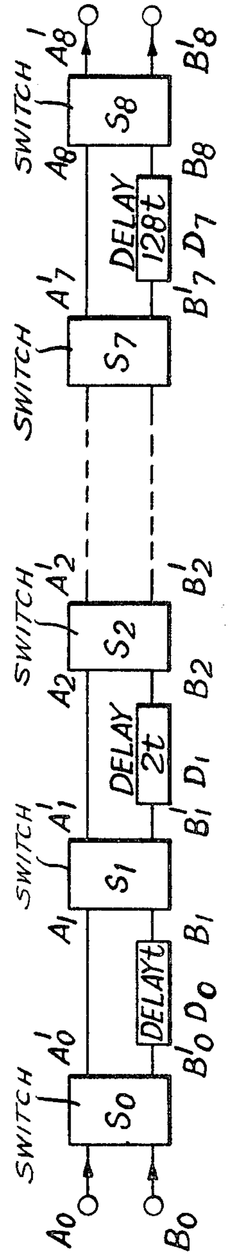
Figure 5B:
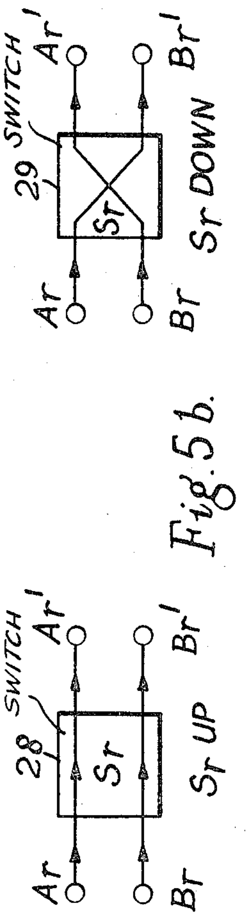
Figure 6:
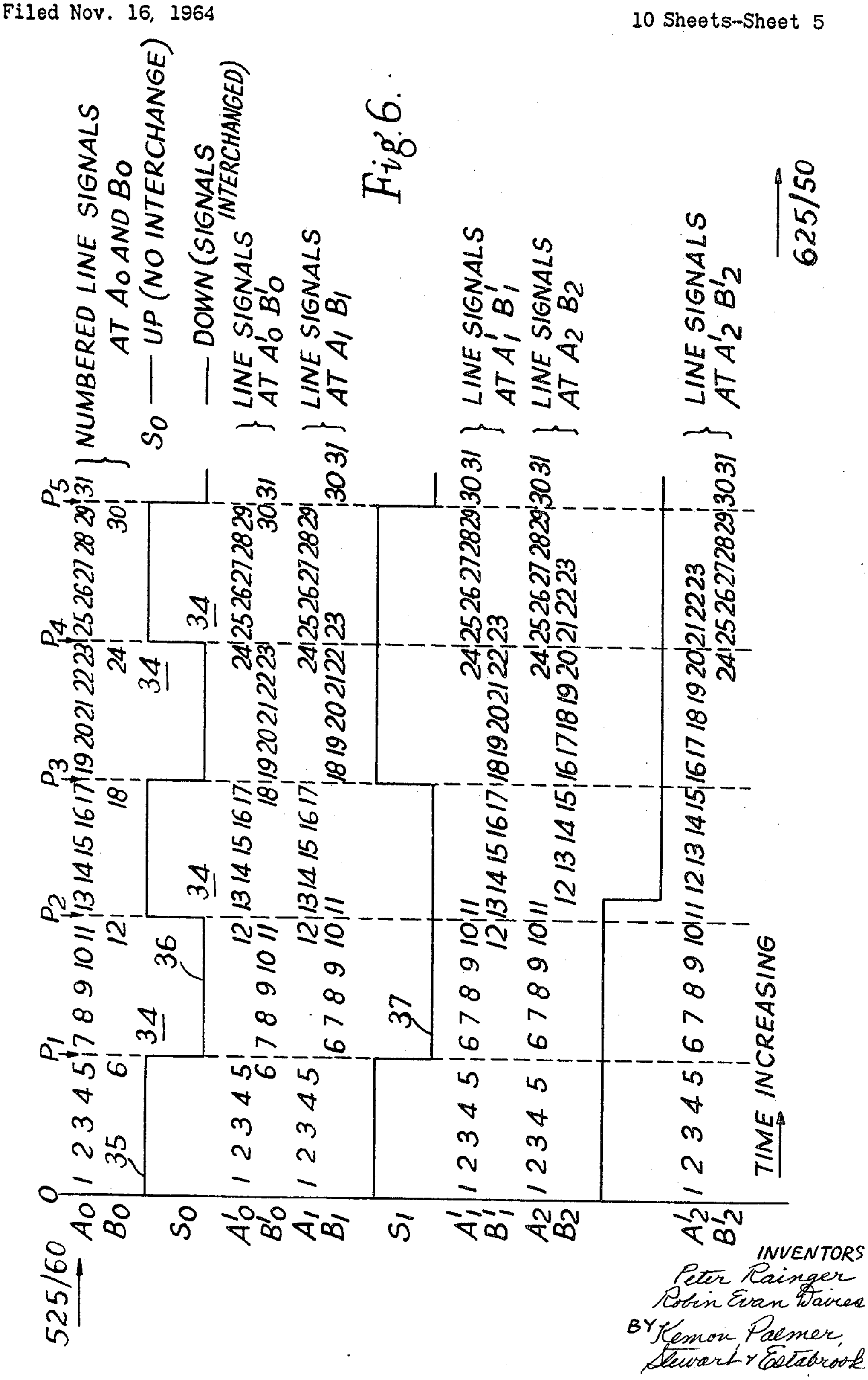
Figure 7:
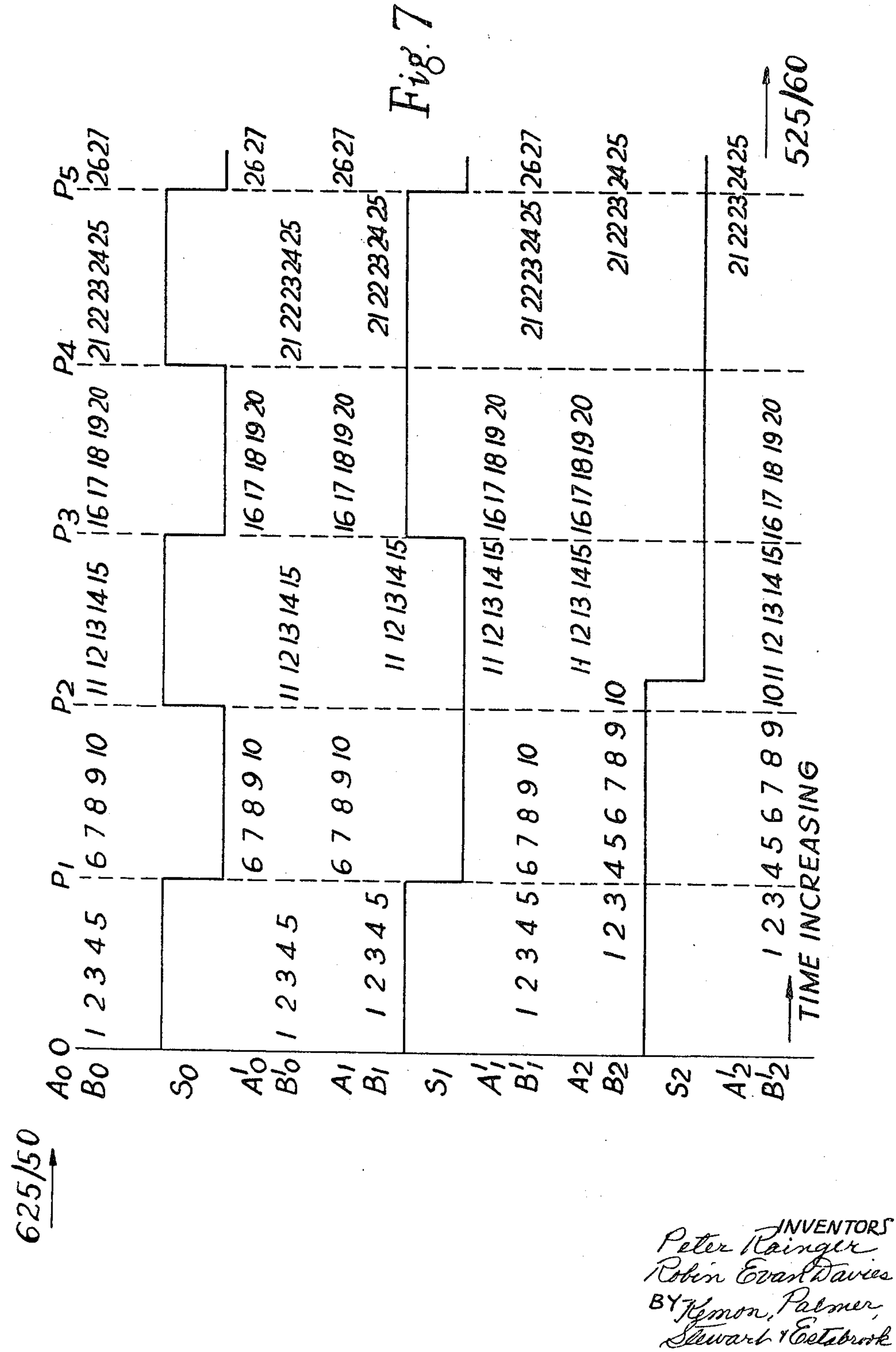
Figure 8:
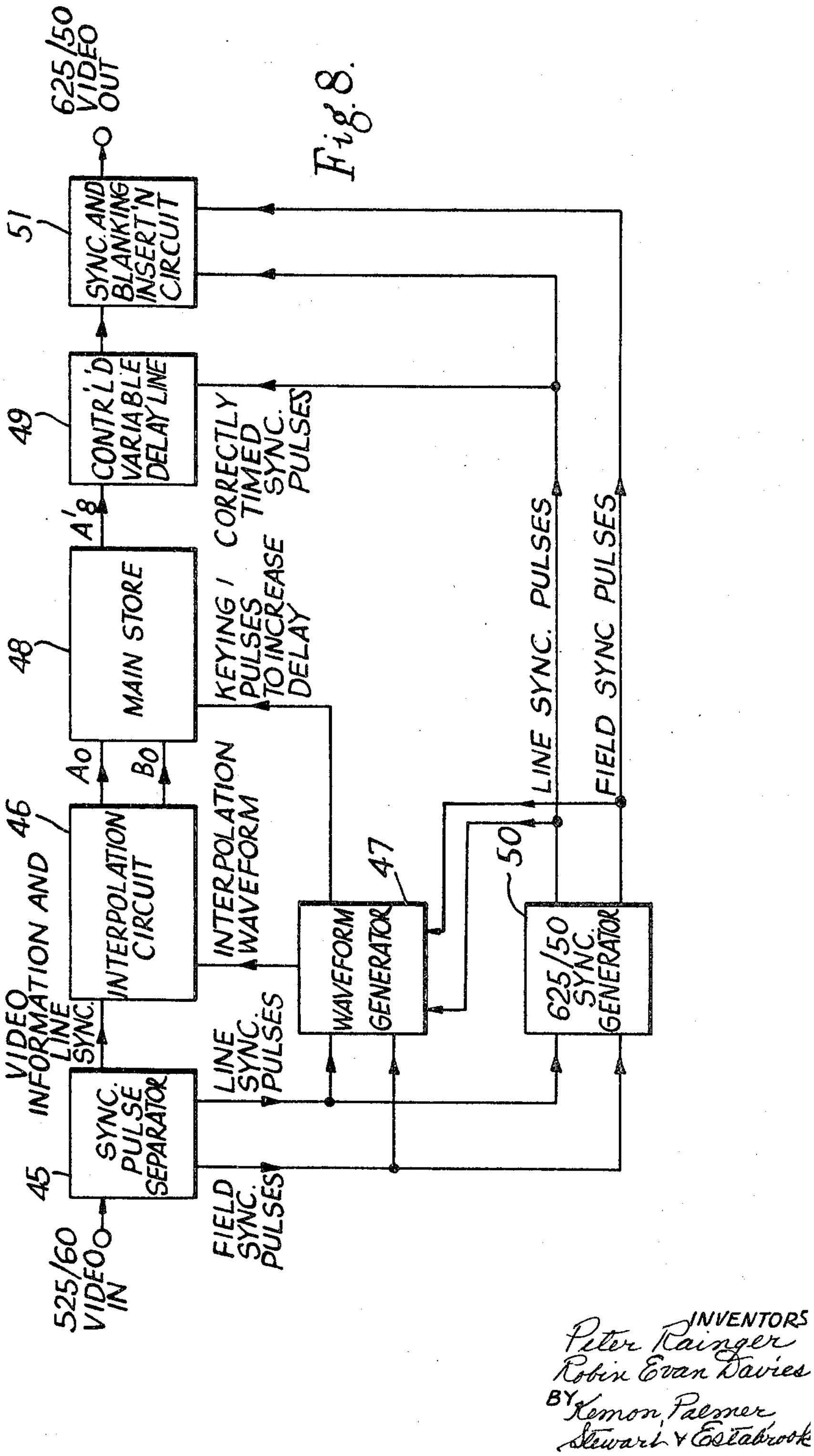
Figures 9A, 9B, 9C:
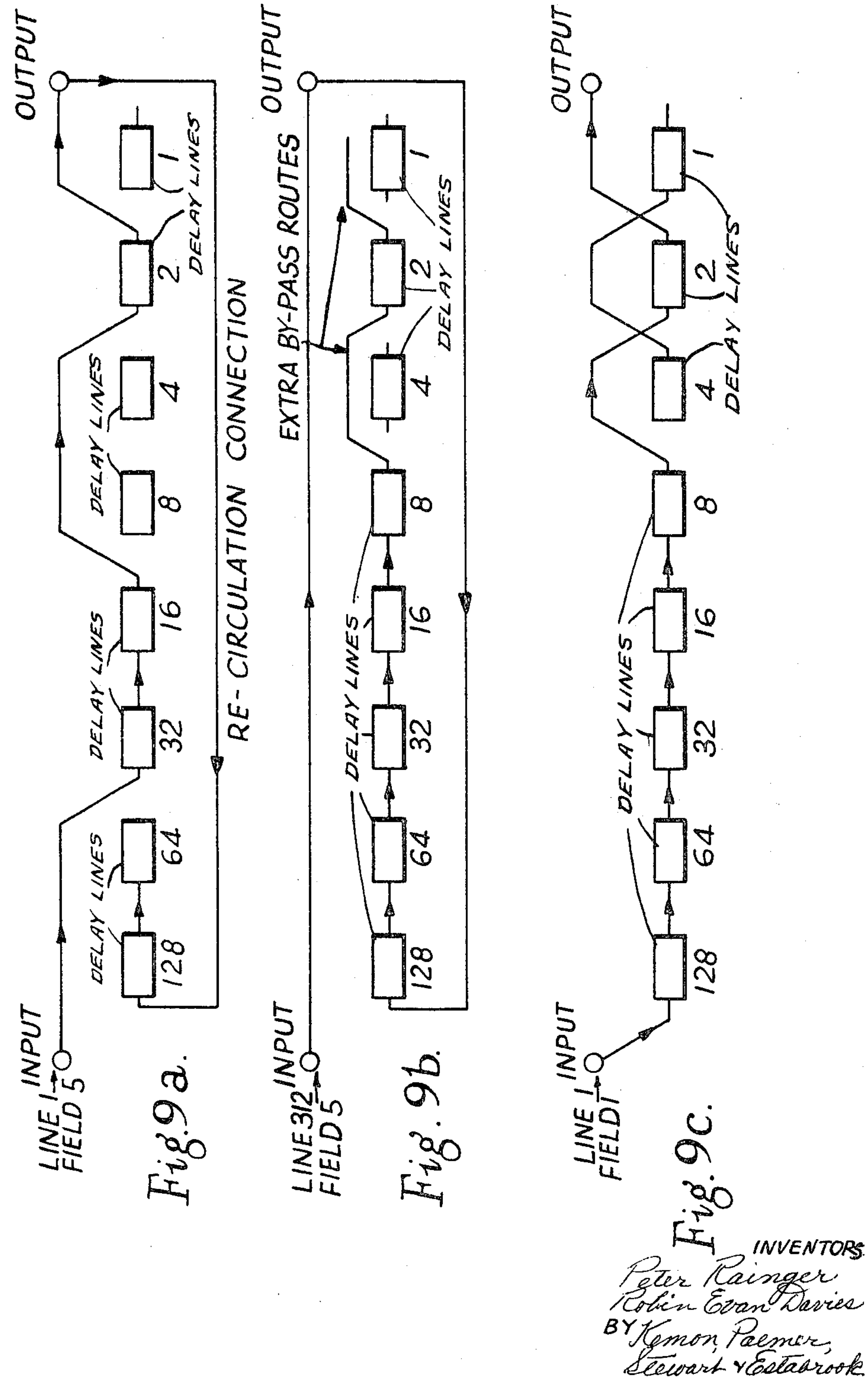
Figure 10:
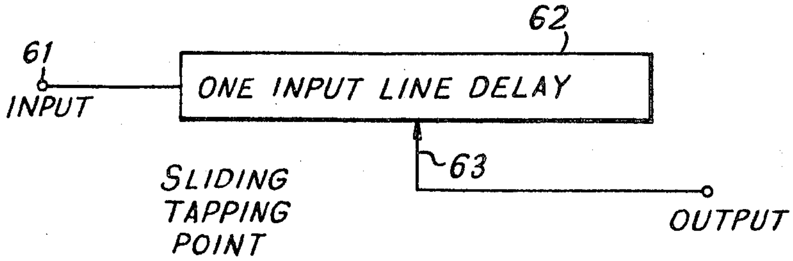
Figure 11:
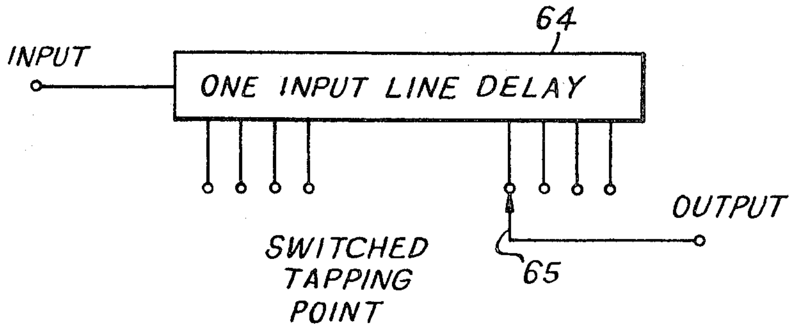

Embodiments of the invention will now be described by way of example with reference to the accompanying drawings, in which:

FIG. 1 is a block diagram of one embodiment of the invention for converting a television signal from 525/60 to 625/50 standards, FIG. 2 shows the relative areas of a normal 625/50 display, FIG. 3 shows an embodiment of the invention for converting a television signal from 625/50 to 525/60 standards, FIGS. 4*a* and *c* show embodiments of the invention for converting a television signal from one field repetition frequency to another, FIG. 4*b* is an explanatory diagram illustrating the manner of operation of the embodiment of FIG. 4*a*, FIGS. 5*a* and *b* show apparatus for carrying out the functions of a delay circuit included in some embodiments of the invention, FIG. 6 is a table showing when some of the switches operate in the apparatus of FIG. 5*a* and the routing of some of the line signals through part of the apparatus during conversion from 525/60 to 625/50 standards, FIG. 7 is a table showing when some of the switches operate in apparatus of the type shown in FIG. 6 and the routing of some of the line signals through part of the apparatus during conversion from 625/50 to 525/60 standards, FIG. 8 is a block diagram of an embodiment of the invention for converting a television signal from 525/60 to 625/50 standards, FIGS. 9*a*, *b* and *c* show further appartus to be used in connection with the apparatus of FIGS. 5*a* and *b* in some embodiments of the invention to carry out the functions of a delay circuit, FIGS. 10 and 11 show alternative embodiments of the invention for converting a television signal from one line repetition frequency to another.

Figure 12:
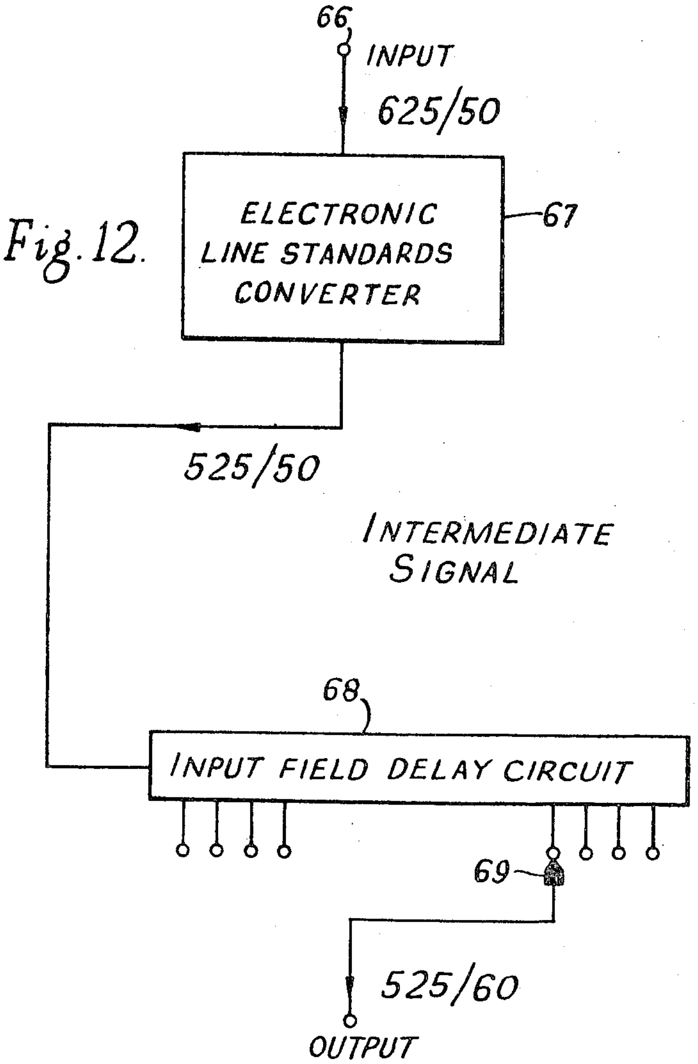

FIG. 12 shows an embodiment of the invention for converting a television signal from one field frequency and one line frequency, to another field frequency and another line frequency.

In FIG. 1 there is shown a delay circuit consisting of delay elements 15, 16, 17 and 18, and means, consisting of a switch 12, for varying the delay introduced by the delay circuit. A 525/60 input television signal, that is to say a signal having 525 lines per picture and 60 fields per second, each picture consisting of two interlaced fields, is passed to an input terminal 10. At the beginning of each cycle of conversion a wiper 11 of the switch 12 connects with a contact 1. Thus the input signal goes direct to an electronic line standards converter 13 which is, for example, of the type described in British patent specification No. 928,730 or No. 966,318.

The signal corresponding to each line of the first field of the 525/60 signal is passed in its turn to a corresponding one of a large number of low pass filters in the converter 13. These filters are scanned, under the control of signals from a generator 14, at frequencies corresponding to a 625/50 display, to form an output signal. A signal for a 625/50 line is generated for each 525/60 line.

At the end of the first input field, the switch wiper 11 is moved to a contact 2. The input signal now passes through the delay element 15 which introduces a delay equal to the difference between the field periods in the two standards approximately 3.3 milliseconds delay. Thus there is a pause of this time before the signal corresponding to the next input field begins to emerge from the delay element 15. This pause allows time for the switch to operate. Only 262 of the 312 lines which make up a full output field have been provided in the first output field, because this is the number of lines in the first input field, and the remaining 50 output lines, which correspond to the time of moving the switch and waiting for the beginning of the next input field to emerge from the delay element 15, are blank, it being arranged that there is no input to the converter 13 at this time. During this pause, the information arriving at the point between the delay elements 15 and 16 corresponds to the end of the first field after it has been delayed.

The second to fifth input fields are now converted in the same way as the first, the switch 12 pausing after each field and introducing successive increments of delay through the delay elements 16 to 18.

Since the 3.3 milliseconds delay is the difference between the periods of the 625/50 field and the 525/60 field, it occurs that, after the end of the fifth incoming field has been read out from the delay element 18, the beginning of the undelayed seventh input field is separated in time from the end of the fifth output field by approximately 3.3 milliseconds.

At the end of the fifth output field the wiper 11 returns directly to the conact 1, the reading operation pauses for 3.3 milliseconds, and the sixth input field is discarded. This does not however interfere with the interlace of the output display since the scanning of the line converter 13 under the control of the generator 14 introduces a new interlace for the output display.

The switching cycle of the switch 12 is repeated at the beat frequency between the input and output field frequencies. That is to say that the time interval taken for the wiper 11 to contact each of the terminals 1, 2, 3, 4 and 5 in turn, and to return to the terminal 1, is equal to six input field periods, which time interval is also equal to five output field periods.

The missing out of one field in every six of the input signal and the blanking of 50 lines in each output field results in less display information at the output than would normally be provided. Thus in FIG. 2, a rectangle 20 represents a normal 625/50 display and a rectangle 19 represents a display converted to 625/50 from 525/60 standards, the rectangle 19 being smaller than the rectangle 20, and the spaces between the rectangles at the top and bottom of the display corresponding to the 50 blank lines. The timing of the generator 14 is so arranged that half the blank lines appear at the top of the display and half at the bottom. In order to keep the aspect ratio of the display correct each line of the output signal is compressed by the line converter 13 and this accounts for the spaces at the sides of the display between the rectangles.

It can be seen from FIG. 2 that in a typical receiver which is adjusted to overscan the receiver mask (represented by line 21) very little of the display is lost.

A modified form of this embodiment may be used for converting between colour television standards. The colour signal is decoded to chrominance and luminance signals, the latter being treated as already described. To convert the chrominance signal an additional line converter (not shown) is used, having enough low pass filters to store the chrominance signals until scanned under the control of the generator 14. The outputs from the two line converters are combined to form the converted colour signal. Separate switched delay networks are not needed for the chrominance and luminance signals. The decoding can be carried out at point A in FIG. 1.

In FIG. 3 is shown a block diagram of another embodiment of the invention which allows conversion of television signals from a 625/50 standard to a 525/60 standard. In this embodiment elements performing similar functions to those shown in FIG. 3 are indicated by the same reference numerals, and a fifth delay line 22 is added. The switch 12 has six output terminals and these are scanned in the opposite order to that described above. When switching from the first to the sixth terminal a field is repeated in the output signal. After 262 lines of each incoming field have been converted, the delay introduced into the input signal is reduced by omitting one of the delay elements and the remaining 50 lines of the input field are lost.

Any switch operation time will also involve some loss of signal for the output signal. For this reason it is preferable to use high speed switching transistors. There is no need for high speed switching when converting from a higher to a lower field frequency: the interval when lines are left blank in the outgoing signal gives ample time. The delay lines need not be highly accurate. For example the 3.3 millisecond lines need only be correct to within 10 microseconds, say.

When converting from a 625/50 to a 525/60 signal, the lines lost cannot be recovered and part of the converted display is missing even though the display can be arranged to fill the normal area of display. A number of lines have been lost from the bottom, or after adjustment from the top and bottom, of each output field. When displayed at 525/60 standards, the output fields are scanned on a raster having a greater scanning angle than a 625/50 raster. Thus, in addition to there being a portion missing from the field at the top and bottom, a distortion occurs in which the image displayed is extended in the vertical direction. To correct the aspect ratio, the lines of the output signal must be expanded by the line standards converter 13 and portions at the beginning and end of each line must be discarded. Thus a complete border region of the converted display will be missing.

It will be understood that line compression and expansion (to preserve aspect ratio) simply involve scanning the low pass filters of the converter 13 more rapidly and less rapidly respectively.

When converting from a 625/50 signal to a 525/60 signal, the switching cycle of the switch 12 is repeated at the same beat frequency as for conversion from a 525/60 signal to a 625/50 signal, that is to say at the beat frequency between the input and output field frequencies. The time interval taken for the wiper 11 to carry out one cycle is equal to five input field periods, which time interval is also equal to 6 output field periods.

The embodiments of the invention shown in FIGS. 1 and 3 can easily be adapted to convert an input television signal into an output television signal having a different line repetition frequency but the same field repetition frequency. For example, a signal having, say, 600 lines per picture and 50 fields per second can be converted into a signal having 500 lines per picture, but still with 50 fields per second, by use of a modified form of the embodiment of FIG. 1. The delay elements 15, 16, 17 and 18 each have a value equal to the difference between an input 600/50 line period and an output 500/50 line period. The wiper 11 moves from each terminal to the following terminal at the end of each input line period, and then waits for a short time interval until the next input line begins to emerge from the delay element introduced by the move to the new terminal. The wiper 11 returns directly to the first terminal at the end of each cycle, the duration of which cycle is equal to the period of the beat frequency between the input and output line frequencies. At the end of each cycle one input line is discarded. The line standards converter 13 is required to restore the correct aspect ratio to the output signal.

Similarly, to convert from a 500/50 signal to a 600/50 signal, a modified form of the embodiment shown in FIG. 3 can be used. Again the value of each of the delay elements 15, 16, 17, 18 and 22 is equal to the difference between an input and an output line period, and again the cycle of switching the wiper 11 is carried out in a period of the beat frequency between the input and output line frequencies. During each cycle of the switch 12, one output line is repeated in the output signal. Due to the fact that the wiper 11 introduces a new delay element before the end of each input line is read out, the information at the ends of all the input lines is lost.

In the embodiments described with reference to FIGS. 1 and 3, it is not essential that the conversion of the signal should be carried out before the interpolation step. The converter 13 can be arranged to carry out the interpolation step before the signal is fed to the delay elements.

Reference will now be made to FIGS. 4 to 12 which show embodiments of the invention which differ from those shown in FIGS. 1 and 2 in that the delay introduced into the input signal is varied at much smaller time intervals, relative to the complete switching cycle, than is the case in the former embodiments. In the limiting case, which for simplicity is described first, the delay is varied continuously. In each case, the various embodiments will be described first with regard to field frequency conversion.

In order that embodiments of the invention may be more easily understood, there will first be given an illustration of a conversion where the input and output field frequencies are in the ratio 5 to 6 respectively and the number of lines per picture in the input and output signals are in the exact ratio 6 to 5.

In FIG. 4*a*, a continuously variable delay circuit 23 has a maximum delay of one input field period, that is corresponding to the lower field frequency.

If the output is taken from a tapping point 24, which is moved from the maximum delay position to the zero delay position in five incoming field periods, the output will be as shown at 25 in FIG. 4*b*, where the outgoing fields 1' to 5' are derived from the incoming fields 1 to 5 shown at 26. The outgoing fields will have been compressed, in time, in relation to the incoming fields 26 and there will be room, in time, for an extra, sixth, output field during one cycle of the incoming fields. This extra field 5'' can be obtained by moving the tapping point 24 back directly to maximum delay after five input field periods have elapsed, whereupon the fifth incoming field will be available again for the output, having just passed through the delay device.

Conversely, if the higher field frequency signal is passed into the delay circuit 23 and the delay increased from zero to maximum (the maximum delay again being equal to one input field period, and therefore being a greater delay than in the former case), the fields will be expanded until at the end of the fifth output field the five outgoing fields will occupy the time for six incoming fields. The tapping point 24 can then be returned to zero delay and the sixth incoming field omitted. Thus, FIG. 4*b* illustrates how the different number of fields in one standard can be produced from the other standard. This conversion depends on the number of lines per picture in the two standards being the same. If they are not, then in order to achieve a one-to-one correspondence of lines a separate line standards converter is necessary. However, if the line periods are close, other means subsequently described may be used.

Figure 4C:
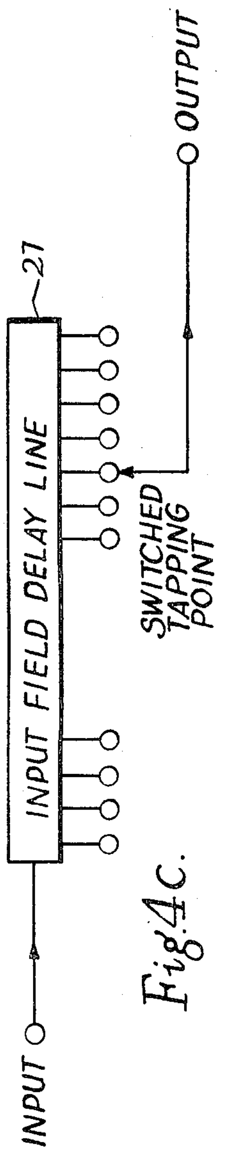

The delay circuit of FIG. 4*a* can be adapted to have fixed tapping points as shown at 27 in FIG. 4*c* instead of being continuously variable. Here the delay between adjacent tapping points equals the period of one input line. Thus, if the tapping point is switched, during blanking time, to reduce the delay after every five lines, the sixth line, stored between tapping points, will be omitted, and from each input picture having say 600 lines a shorter one of 500 lines is produced. Conversely, if the tapping point is switched to increase the delay, a line will be repeated every five lines.

Signals produced in this way are not suitable to be displayed directly on a television screen, as any sloping lines in the input picture will appear ragged in the output picture because of the lines missed out. This effect can be overcome by interpolating between lines in the way used in line standards converters such as those described in British patent specifications Nos. 928,730 and 966,318.

Systems for carrying out conversion between 625/50 and 525/60 standards will now be described. In this conversion there is a slight difference between line periods which must be taken into account.

If rasters of the two line standards are superimposed, then every so often two lines of the 625/50 display appear between two lines of the 525/60 display. It is one of those two lines which must be discarded in conversion from 625/50 to 525/60 standards or inserted in conversion from 525/60 to 625/50 standards. At the end of each field the number of lines added or discarded must make up the difference in lines between the two standards, that is 50 lines.

Since the maximum delay required from the delay circuit (when converting from 525/60 to 625/50 standards) is $\frac{1}{60}$ second, the period of the higher field frequency, the delay to be introduced per field is $\frac{1}{5}\times\frac{1}{60}$ second. Now, this delay has to be divided over the 50 lines discarded or repeated per field, so the unit of delay is $\frac{1}{5}\times\frac{1}{60}\times\frac{1}{50}=66\frac{2}{3}$ microseconds.

When converting from 525/60 to 625/50 standards, the delay is increased until, at the end of five input field periods, the delay is 250 units and the start of the seventh input field is synchronous with the start of the sixth output field. Thus, the sixth input field can be discarded.

When converting from 625/50 to 525/60 standards, the maximum delay is again equal to one input field period, which in this case is equal to 300 line periods. At the beginning of the switching cycle the delay is equal to 300 units and after five input fields it has been reduced to zero. The tapping point is then returned to the position of maximum delay and the fifth input field, now delayed by the maximum delay, is read out again in the output signal and constitutes the sixth output field.

Instead of using a single variable delay device with several hundred taps it is more economical to use a small number of different fixed delay elements with variable connections arranged to give the required delay to any particular signal. Embodiments of the invention in which such delays are used will be described with reference to FIGS. 5 to 9.

The basic unit of delay ($66\frac{2}{3}$ microseconds) is chosen as the delay value of one delay element, and the other delay elements are made with delays of two delay units, four delay units, eight delay units, and so on, to form a series of binary delay elements. For 8 delay lines there are $2^8-1=255$ possible combinations of delays. Since only 250 units of the delay are required when converting from 525/60 to 625/50 standards, 8 delay lines only are necessary and these will have delays of $t$, $2t$, $4t$, $8t$, $16t$, $32t$, $64t$ and $128t$ where $t=66\frac{2}{3}$ microseconds.

In the case of the simple tapped variable delay circuit similar to that shown in FIG. 4*c*, it was stated that 300 tapping points are required when converting from 625/50 to 525/60 standards, because the maximum delay required must be equal to one input line period, which is equal in this case to 300 line periods. However, when a number of fixed delay elements are used and the input signals are switched between them, it is not always necessary, as will be described hereinafter, with reference to FIGS. 9*a*, *b* and *c*, to provide varying delays which correspond exactly to the 300 different stepped delays of the apparatus corresponding to that shown in FIG. 4*c*. It would, of course, be possible to provide 300 such different delay values by the use of combinations of nine fixed delay elements. In general, N fixed binary devices having delay values of $2^r$T where $r=0, 1, 2 \ldots, N-1$, can, with appropriate switching, provide a number of delays having values RT where $R=0, 1, 2, \ldots, 2^{N-1}$, and the delay provided can be varied in steps of T.

Returning to the case of conversion from 525/60 to 625/50 standard, any particular signal will be routed to pass through the appropriate delay elements to obtain the required delay. In order to decide the route of a signal the delay required (in delay units) is changed to a binary number. The signal is then routed through the delay elements represented by one in the binary number and by-passes those with zero in the binary number. For example, if the delay is to be 49 units, 49 is first expressed in binary form, that is, $$1\times32+1\times16+0\times8+0\times4+0\times2+1\times1$$

A signal is then routed through the delay elements having 32, 16 and 1 unit of delay and by-passes those with 8, 4 and 2 units.

FIG. 5*a* shows a store made up of delay lines $D_0$ to $D_7$ and switches $S_0$ to $S_8$. Each switch has two input terminals A and B, and two output terminals A′ and B′. Two states of typical switch $S_r$ are shown at 28 and 29 in FIG. 5*b*. The straight through connection known as $S_r$ UP is shown at 28 and the other condition when the A input connects with the B′ output and the B input connects with the A′ output is shown at 29 and is called $S_r$ DOWN.

The variable delay circuit including the fixed delays $D_0$ to $D_7$ will be referred to as the main store. At the beginning of the main store, line signals are sometimes injected simultaneously into terminals $A_0$ and $B_0$ and are then delayed relative to each other so that they fall into the correct sequence at the output terminal $A_8'$. In some circumstances signals from the terminal $B_8'$ are also required, as described later with reference to FIGS. 9*a* and 9*b*.

The sequence of operation of the first three switches $S_0$, $S_1$ and $S_2$ for converting 525/60 to 625/50 standards is shown in FIG. 6. The FIGURES 1 to 31 horizontally across the figure represent the first 31 lines of the first output field in a cycle of fields.

The time axis is shown increasing from left to right. Thus the sequence of the line numbers show when the lines pass through the terminals such as $A_0B_0$ shown in the left column of FIG. 6. For example line 1 is the first to appear at terminal $A_0$, and since $S_0$ is UP (as shown by the position of the line 34 at the point 35), it by-passes the first delay element, and also by-passes all the other delay lines in the store because all the switches $S_0$ to $S_8$ are also UP. Thus the first line passes through without delay and this applies to lines 2 to 5 also. For this conversion, the first group of five input lines is not delayed, but the sixth line to be provided has to be inserted by repeating the fifth input line. The fifth input line is therefore inserted again at the input terminal $B_0$ (and here given the number 6, as it will become the sixth output line) in addition to being inserted at terminal $A_0$ (where it is called line 5). After passing through $S_0$, line signal 6 is delayed by one unit and therefore appears after line 5 at switch $S_1$.

Lines 7 to 11 require to be delayed by one unit. They are therefore switched by $S_0$ which is now DOWN (see point 36) and after passing through the first delay element they are switched DOWN by $S_1$ (point 37) and thereafter pass through without delay.

The remainder of the lines (in the first field) are treated in a similar way according to the amount of delay they require.

The routes, which the lines of the second field follow when they are injected after the first field into the main store, are determined in the same way as for the lines of the first field. An extended form of FIG. 6 could be used to follow the switching operations. Fields three to five are treated in the same way but the sixth field is discarded.

FIG. 7 shows conversion from 625/50 to 525/60 standards. Here the first input line requires the maximum delay of one field. It is therefore inserted at terminal $B_0$ and is progressively delayed by all the delay elements, in turn, the switches $S_0$ to $S_8$ being operated accordingly. The gap appearing at the terminal $B_0$, which occurs in the input sequence after the fifth line, occurs because the sixth input line is discarded. The seventh input line is called line 6 in the figure because it appears in this position in the output signal. The gap is closed when the first group of line signals has passed through the first delay element $D_0$ and the second group of line signals has by-passed it, as is shown at the terminal $B_1'$.

The timing of switch operations has to take into account the delays which the signals have experienced before any switch is reached. Correct timing can be obtained by inserting keying pulses into the input signal in the line blanking periods before the signal reaches the delay line store, the pulses being inserted at the part of the signal where delay is required.

These pulses can then be detected at points such as $A_r$ and $B_r$ and used to control the switch $S_r$.

The switch $S_0$ is changed over every time a keying pulse is detected at $A_0$ or $B_0$; the switch $S_1$ is changed over for every second keying pulse (starting with $P_1$) detected at $A_1$ or $B_0$; the switch $S_2$ is changed over for every fourth keying pulse (starting with $P_2$) detected at $A_2$ or $B_2$; and so on.

If then the pulses are inserted as shown in FIGS. 6 and 7 at times $P_1$, $P_2$, $P_3$ to $P_{250}$ the switches will change from one condition to the other at the following times:

$S_0$ changes over at times $P_1$, $P_2$, $P_3$, $P_4$ . . . $P_{250}$
$S_1$ changes over at times $P_1$, $P_3$, $P_5$, $P_7$ . . . $P_{249}$
$S_2$ changes over at times $P_2+t$, $P_6+t$, $P_{10}+t$ . . . $P_{250}+t$
$S_3$ changes over at times $P_4+3t$, $P_{12}+3t$, $P_{20}+3t$ . . . $P_{248}+3t$
$S_4$ changes over at times $P_8+7t$, $P_{24}+7t$ . . . $P_{236}+7t$
$S_5$ changes over at times $P_{16}+15t$, $P_{48}+15t$ . . . $P_{244}+15t$
$S_6$ changes over at times $P_{32}+31t$, $P_{96}+31t$ . . . $P_{228}+31t$
$S_7$ changes over at times $P_{64}+63t$ and $P_{194}+63t$
$S_8$ changes over at times $P_{128}+127t$ The delays of $t$, $3t$, $7t$ and so on arise because the keying pulses which operate $S_2$, $S_3$, $S_4$ and so on have passed through the delay elements $D_0$, $D_1$, $D_2$ and so on.

If pulses operating the switches are not inserted as described, some subsidiary circuits could be used instead. These may consist of electronic delays and counting circuits to operate the switches at the times shown in the table above.

There are two types of delay line at the moment thought to be most suitable. They are the ultrasonic delay line and the magnetic drum or disc with spaced input and output transducers. Any delay line used must be highly stable in gain and delay and sufficiently distortionless to allow the connection in series of eight delay lines without causing noticeable deterioration in picture quality.

Ultrasonic quartz delays, and magnetic drums, tapes or discs, usually require the signal delayed to be modulated on a carrier. Since the signals are switched among a number of paths whose linearity and gain characteristics may differ from each other, modulation systems such as frequency modulation and pulse code modulation are usually preferable to amplitude modulation. Delays shorter than about 1 $\mu$s. may be constructed from delay cable or passive circuits and may be sufficiently distortionless to allow any or no modulation system to be used.

Where a magnetic drum is used the signal to noise ratio may prevent eight or more input/output transducer combinations in series being used. This can be overcome by using other delay sequences than that already described. For example two tracks could be used, each with a writing head and, with $n$ and $m$ equispaced reading heads respectively. Provided $n$ and $m$ are integers with no common factors, a total of $n \times m$ different delays can be produced by switching between the reading heads and only connecting two input/output transducer combinations.

FIG. 8 is a block diagram showing a converter for 525/60 to 625/50 conversion based on a main store of delay elements as described above.

The 525/60 signal passes first through a synchronising pulse separator 45 and then into an interpolation circuit 46, which produces the required input signals at terminals $A_0$ and $B_0$. Thus at the same time that every fifth or sixth (depending on when lines are to be added) line is applied to $A_0$ a line interpolated between that line and the succeeding line is applied to $B_0$. (When converting from 625/50 to 525/60, the interpolation circuit produces, in the signal fed to $B_0$, the gaps which occur after every fifth line. In the 625/50 to 525/60 case the interpolation circuit is also sometimes required to produce two consecutive output fields from one input field.)

A waveform generator 47 having inputs of field and line synchronising pulses from the synchronising pulse separator and from a 625/50 synchronising pulse generator 50 produces a waveform controlling the interpolation circuit as described in the aforesaid British patent specifications.

After interpolation the video signal passes through the main store 48 of switched delay elements to a controlled variable delay device 49 whose function is to correct the timing errors which arise during conversion. Some such errors are those due to the lines not being of exactly the same period. Others may be due to small errors in the delays of the switched delay elements and small differences in input field frequency from the nominal value. The variable delay 49 may be either programme-controlled or servo-controlled and in the latter case synchronising pulses need to be inserted in the blanking intervals immediately preceding the active line signals before they are transmitted through the switched delay elements.

The variable delay line 49 is under the control of line synchronising pulses, from the 625/50 synchronising pulse generator 50, which are locked to the incoming signal through the synchronising pulse separator 45. These pulses are compared with the line synchronising pulses in the signal at the output of the delay line 49 which is continuously adjusted so as to maintain synchronism between the line synchronising pulses of the output signal and those of the synch. generator 50. The functions of the delay device 49 can be fulfilled by a further binary switched delay circuit of similar form to the main store already described but having a maximum delay of one line period. The interchange switches separating the delay elements can here be replaced by single-pole, two-way switches, the output of each delay element being connected to the next by-pass route and this point being connected by the switch to either the input of the next delay element or to its by-pass route. The switches are set in the appropriate manner to give the required delay for any line signal and remain connected in that way during the passage of that line signal through the delays.

The processed video signal now passes to output through a synchronising and blanking insertion circuit 51 controlled by the synchronising pulse generator 50.

When converting from 625/50 to 525/60 standards either of two methods of repeating every fifth field may be used. The first method requires the use of an additional delay line of minimum length 45 units to delay the fifth input field by a maximum of 300 units, that is the input field period 1/50 second divided by the unit of delay 66⅔ microseconds. The second method delays and repeats the first compressed field 5' in FIG. 4*a*. Here the 250 units of delay already available are sufficient.

Both methods require an additional half line period of delay at times to interlace the repeated output fields.

When the additional 45 units of delay are provided they are inserted between the 64 and 32 unit delay elements. The additional 45 units of delay are required because the main store already described can provide up to 255 units of delay. The additional units make the total up to the 300 units required. Switches of the same type as already used by the store control this new delay element. The number of switches is increased to 10, i.e. $S_0$ to $S_9$.

The signals must in this conversion pass through the store in the opposite direction than in the previous conversion. That is the input and the output terminals are interchanged so that $A_0$ and $B_0$ are now the output terminals and $A_9'$ and $B_9'$ are the input terminals. The switching logic is more complicated but similar in principle to that already described.

The input signal is injected at both store input terminals $A_9'$ and $B_9'$ at the same time and the first five output fields are taken from the output terminal $A_0$. Field 5 then appears again at the output terminal $B_0$ after these first five fields and can be switched into sequence. The reason for these fields arriving in the correct sequence is that field 5 in FIG. 4*b* requires a short delay at its start and no delay at its end to form field 5', and there is therefore maximum delay available in the alternative path which is the one which starts from terminal $B_9''$. The repeat of field 5 then receives maximum delay and forms field 5''. The switching operations for the next group of six output fields are the same as for the previous six output fields and the half line period extra delay is provided between alternate groups of six output fields.

For the other method of repeating the fifth field by recirculation, the 45 unit delay element is not used but the signals are still passed from new input terminals $A_8'$ and $B_8'$ to the new output terminals $A_0$ and $B_0$.

Referring to FIG. 4*b* the field 5' has to be repeated to form the field 5''. Since these fields are at the output field frequency of 60 fields/second each part of the 5' field has to be delayed by 1/60 second or 250 units of delay. The first line signal of field 5' to be recirculated will follow the last line signal of field 5' through the output and the last recirculated line signal of field 5' will precede the first line signal of the first field in the next group.

FIG. 9*a* shows the connections at the time the first line of incoming field 5 goes through the delay line, experiencing 50 units of delay. This line is then recirculated to the 128 unit delay line but the connections shown in FIG. 9*a* for recirculation will change so that in fact this first line will receive the full 250 units of delay.

The last line of field 5 receives no delay and when it comes to be recirculated the full 250 units of delay line are in circuit as shown in FIG. 9*b*. For this two extra bypass connections are required. In FIG. 9*c* the first line of field 1 in the next group is receiving maximum delay before the last line of field 5 has been passed to the output after recirculation.

As before a half line period of delay is required during alternate groups of six output fields.

If the system using the 45 extra delay units is used, interpolation may be carried out before input to the main delay line store, two inputs from field 5 being made simultaneously. In the other system, interpolation at the input is not useful since the field 5'' is a replica of field 5'. Interpolation is therefore carried out at the output, even though some input lines have been discarded. This is possible since these lines are still available at the second store output and can be used for interpolation. Field 5 is therefore interpolated two simultaneously after passing through the store to give field 5' and 5''.

In the descriptions of field frequency conversion, it has been assumed that the field frequencies are locked together.

If the field frequencies are not locked, errors will accumulate in the timing of output line signals. A further variable delay device with maximum delay of one line period may be used to correct these timing errors. When errors amount to one line period the further delay device is switched back to maximum or zero and a unit of the main store is switched in or out. The cycle of increasing or decreasing delay is no longer exactly five field periods and may start at any vertical position in the picture.

In the embodiments described hereinbefore, the field frequency ratio between the input standard and converted output standard has been taken to be exactly 5 to 6. It has also been stated that when the input and output frequencies are not locked other ratios can be obtained by employing a variable delay (49 in FIG. 8) of maximum length equal to one line duration. A further possibility exists. By slightly varying the basic time unit T of the delay circuit (previously equal to 66⅔ μs.) and the total number of different delays introduced (previously equal to 250 or 300 delays in the simple embodiments), other field conversion frequency ratios may be obtained. The relationships below must hold:

$$F_1-F_2=\frac{(625-525)}{2}T=50T \qquad (1)$$

$$2F_1=KT \qquad (2)$$

where $F_1$ and $F_2$ are the field periods of the two standards and K is an integer.

The field frequency ratio is then:

$$\frac{F_1}{F_2}=\frac{100+K}{K}$$

The total number of different delays introduced is now $K/2$, if K is even or $$\frac{K-1}{2}$$

if K is odd.

For the case of 5 to 6 field frequency ratio:

$F_1=20$ ms.
$F_2=16\frac{2}{3}$ ms.
$T=66\frac{2}{3}$ ms.
$K=500$

One case which is of particular interest is $K=503$
$T=66.335$ μs.

Here the field frequencies are 59.94005 c./s. and 49.99974 c./s. on the two standards. These are the closest frequencies attainable to the American and proposed British colour television frequencies.

In order to prevent judder in moving picture detail when one field in five is omitted or repeated (this effect is similar to the ragged appearance of sloping picture detail produced when one line is omitted or added) corresponding lines of consecutive fields may be interpolated so that information from adjacent picture lines is combined rather than from adjacent field lines. To do this a delay of one field period is required so that corresponding lines may be interpolated. (An interpolator of the same kind as that used for line interpolation is suitable.)

In general, in conversion of number of lines per picture, lines have to be repeated or discarded at regular intervals. Thus, smoothly sloping picture detail in the original scene becomes ragged. Interpolation (as described in the aforesaid British patent specifications) is used to correct this so that a sloping line appears smooth.

In conversion of field frequency, fields have to be repeated or discarded. Thus, smoothly *moving* picture detail (i.e., changing position from field to field) no longer moves smoothly and appears to "judder" as it moves. Interpolation between successive fields can be used to correct this.

For signals locked to the main electricity supply frequency, the field duration may differ by as much as 40 μs. from nominal value. The field delay required may be obtained from a fixed delay equal in duration to the shortest field duration expected, plus a variable delay obtained from a binary switched delay circuit of the type described hereinbefore, which is servo-controlled to the actual field duration. The switches are set by external control circuits which detect the timing error, express it in binary code and alter the switches acordingly.

Reference will now be made to FIGS. 10 and 11 which show simple embodiments of the invention for converting an input television signal into an output television signal have a different line repetition frequency but the same field repetition frequency. For simplicity the conversions outlined will be taken to be, by analogy with field conversion, from 600 lines per picture to 500 lines per picture, and vice versa. It will be appreciated however that the apparatus can easily be modified to convert from 405/50 to 525/50 standards.

In the embodiment of FIG. 10, an input television signal is fed from an input terminal 61 to a variable delay circuit 62 having a maximum delay value of one input line period. In the case of conversion from 500 to 600 lines per picture, at 50 fields per sec., the maximum delay is equal to $$\frac{1}{50}\times\frac{1}{250}$$

second. At the beginning of a switching cycle, a sliding tapping point 63 moves from the position of maximum delay and reduces continuously the delay introduced until, after five input line periods have elapsed, the tapping point is at the position of zero delay. The tapping point then returns directly to the point of maximum delay, whereupon the fifth input line is repeated in the output signal. The cycle of switching is carried out over a time interval equal to the period of the beat frequency between the input and output line frequencies.

When converting from 600 to 500 lines per picture, the maximum delay of the delay circuit 62 is again equal to one input line period, which in this case, for signals having, say, 50 fields per sec., is equal to $$\frac{1}{50}\times\frac{1}{300}\text{ sec.}$$

At the beginning of each switching cycle, the tapping point is at the position of minimum delay, and the point moves to the position of maximum delay over a time interval of 6 input line periods, which is also equal to 5 output line periods. At the end of the cycle, the tapping point returns directly to the position of minimum delay, with the result that the sixth input line is discarded. FIG. 11 shows a delay circuit 64 which is variable in steps in similar manner to that shown in FIG. 4*c*. The delay introduced by moving from one tap to the next is equal to a fraction of the duration of a picture element, the fraction being equal to the difference between the input and output line periods divided by the input line period. The maximum delay of the delay device 64 is equal to one input line period. The number of tapping points is such that, when the tapping point 65 is switched from the maximum to minimum delay or vice versa in a manner exactly analogous to that described with reference to FIG. 4*c*, a number of picture elements are added or discarded so that, at the end of each cycle, a whole input line can be discarded or a whole output line repeated. The switching cycle is again carried out over a time interval equal to 6 line periods at higher frequency or 5 line periods at the lower frequency.

It will be appreciated that the delay circuit 64 may be replaced by a circuit of binary delay devices such as have been described for field frequency conversion. In such a case, the input television signal is sampled and each sample carried by a short pulse. The pulsed signal is applied to the input of the binary switched delay circuit, and switching operations are controlled to take place between pulses so that the information is not interfered with by switching.

In conversion from the 625/50 standard to the 405/50 standard, the delay unit may be 10 $\mu$s. or less, 14 or more binary delays being required whose lengths are binary multiples of the delay unit.

There will now be described with reference to FIG. 12 a further embodiment of the invention for carrying out conversion of field and line frequencies. The apparatus shown in FIG. 12 is for converting from 625/50 to 525/60 standards.

The input television signal at the 625/50 standard is fed from an input terminal 66 to an electronic line-standards converter 67, which may be of the type described in British patent specifications Nos. 928,730 or 966,318. The converter 67 converts the 625/50 signal to a 525/50 intermediate signal. The converter 67 merely carries out an interpolation process, and it is not necessary to expand the converted lines to form a continuous signal at the intermediate stage. Instead the intermediate signal consists of 525 lines in each picture, the lines being separated in time by pauses equal to the difference between the line repetition period of the 525/50 signal and a 525/60 signal. These pauses are removed in a variable delay circuit 68.

The delay circuit 68 is a variable, tapped delay circuit similar to those described hereinbefore. The maximum delay of the circuit is equal to one input field period, and the delay introduced by moving a switched tapping point 67 from any one of the taps to the next adjacent tap is equal to the said difference between the line repetition period of the 525/50 intermediate signal and that of the 525/60 output signal, which difference is equal to 12.9 $\mu$s. The switching cycle of the tapping point 69 is carried out over a time interval of 5 field periods at the input field frequency, which is equal to 6 field periods at the output field frequency. At the beginning of each cycle, the tapping point 69 is at the position of maximum delay and the delay is reduced by one unit of delay (12.9 $\mu$s.) at the end of each input line period in such a manner as to remove the pauses referred to above. The number of tapping points is equal to one input field period divided by the unit of delay which number in the present case is 1575. At the end of each switching cycle, the switched tapping point 69 returns directly to the position of maximum delay, and the fifth output field is repeated.

It will be appreciated that the delay circuit 68 can be replaced by a binary switched delay circuit of the type described in relation to field conversion with reference to FIGS. 5, 6 and 7. Eleven delay elements are required to make up the delay circuit, the values of their delays being equal to 12.9 $\mu$s., $2\times12.9$ $\mu$s., $4\times12.9$ $\mu$s., and so on.

It will also be appreciated that the apparatus shown in FIG. 12 can be adapted to convert from a 525/60 to a 625/50 signal. In such a case the maximum delay of the delay circuit would be equal to one field period at the 60 fields per second standard, and the signal would be processed first by the delay circuit and secondly by an electronic line standards converter.

What is claimed is:

1. Apparatus for generating from an input television signal an output television signal having a lower field repetition frequency than said input signal, said apparatus comprising:

a variable delay circuit;

connecting means, said connecting means feeding said input signal to said variable delay circuit, and control means, said control means operating to increase progressively the delay introduced by said delay circuit from a minimum to a maximum value during a time interval substantially equal to a small integral multiple of the period of the beat frequency between said input and said output field frequencies, said control means also operating said delay circuit to return said delay directly to said minimum value at the end of said time interval, the difference between said maximum and said minimum delay values being such that, at the end of said time interval, a small integral number of input fields is discarded from said input signal.

2. Apparatus for generating from an input television signal an output television signal having a lower field repetition frequency than said input signal, said apparatus comprising:

a variable delay circuit, connecting means, said connecting means feeding said input signal to said variable delay circuit, and control means, said control means operating to increase progressively the delay introduced by said delay circuit from a minimum to a maximum value during a time interval substantially equal to a small integral multiple of the period of the beat frequency between said input and said output field frequencies, said control means also operating said delay circuit to return said delay directly to said minimum value at the end of said time interval, said control means varying the delay introduced by said delay circuit in discrete units of delay each of which is substantially equal to a small integral multiple of the difference between an input and output field period, said control means operating said delay circuit to change said delay introduced by said delay circuit by one discrete delay unit at regular time intervals each of which is equal to a small integral multiple of one output field, the difference between said maximum and said minimum delay values being such that, at the end of said time interval, a small integral number of input fields is discarded from said signal.

3. Apparatus for generating from an input television signal an output television signal having a lower field repetition frequency than said input signal, said apparatus comprising:

a variable delay circuit, connecting means, said connecting means feeding said input signal to said variable delay circuit, and control means, said control means operating to increase progressively the delay introduced by said delay circuit from a minimum to a maximum value during a time interval substantially equal to the period of the beat frequency between said input and said output field frequencies, said control means also operating said delay circuit to return said delay directly to said minimum value at the end of said time interval, said control means varying the delay introduced by said delay circuit in discrete units of delay each of which is equal to the difference between an input and output field period, said control means operating said delay circuit to change said delay introduced by said delay circuit by one discrete delay unit at regular time intervals each of which is equal to one output field period, the difference between said maximum and said minimum delay values of said delay circuit being equal to one input field period minus one discrete unit of delay.

4. Apparatus for generating from an input television signal an output television signal having a lower field repetition frequency than said input signal, said apparatus comprising:

a variable delay circuit, connecting means, said connecting means feeding said input signal to said variable delay circuit, and control means, said control means operating to increase continuously the delay introduced by said delay circuit from a minimum to a maximum value during a time interval substantially equal to a small integral multiple of the period of the beat frequency between said input and said output field frequencies, said control means also operating said delay circuit to return said delay directly to said minimum value at the end of said time interval, the difference between said maximum and said minimum delay values being equal to a small integral multiple of one input field period.

5. Apparatus for generating from an input television signal an output television signal having a lower field repetition frequency than said input signal, said apparatus comprising:

a variable delay circuit, connecting means, said connecting means feeding said input signal to said variable delay circuit, and control means, said control means operating to increase progressively the delay introduced by said delay circuit from a minimum to a maximum value during a time interval substantially equal to a small integral multiple of the period of the beat frequency between said input and said output field frequencies, said control means also operating said delay circuit to return said delay directly to said minimum value at the end of said time interval, said control means varying the delay introduced by said delay circuit in discrete units of delay substantially equal to a small integral multiple of an input line period, said control means operating said delay circuit to change said delay introduced by said delay circuit by one discrete delay unit at regular time intervals so that there is discarded from the input signal a number of lines which are evenly distributed throughout each field of the input signal, the difference between said maximum and said minimum delay values being such that, at the end of said time interval when said delay introduced by said delay circuit is varied from said minimum to said maximum value, a small integral number of input fields is discarded from said input signal.

6. Apparatus for generating from an input television signal an output television signal having a lower field repetition frequency than said input signal, said apparatus comprising:

a variable delay circuit, connecting means, said connecting means feeding said input signal to said variable delay circuit, a number of delay elements having different fixed delay values, said delay elements constituting said variable delay circuit, and control means, said control means operating to increase progressively the delay introduced by said delay circuit from a minimum to a maximum value during a time interval substantially equal to a small integral multiple of the period of the beat frequency between said input and said output field frequencies, said control means also operating said delay circuit to return said delay directly to said minimum value at the end of said time interval, said control means varying the delay introduced by said delay circuit in discrete units of delay substantially equal to a small integral multiple of an input line period, said control means operating said delay circuit to change said delay introduced by said delay circuit by one discrete delay unit at regular time intervals so that there is discarded from the input signal a number of lines which are evenly distributed throughout each field of the input signal, the lowest of said fixed delay values of said delay elements being equal to said discrete delay unit, the other fixed delay values being equal to multiples of the lowest value with increasing integral powers of the number 2, said control means varying the delay introduced by the delay circuit in the said discrete delay units by feeding the input signal through different combinations of the delay elements, the difference between said maximum and said minimum delay values being such that, at the end of said time interval during which said delay is varied from said minimum to said maximum value, a small integral number of input fields is discarded from said input signal.

7. Apparatus for generating from an input television signal an output television signal having a higher field repetition frequency than said input signal, said apparatus comprising:

a variable delay circuit, connecting means, said connecting means feeding said input signal to said variable delay circuit, and control means, said control means operating to decrease progressively the delay introduced by said delay circuit from a maximum to a minimum value during a time interval substantially equal to a small integral multiple of the period of the beat frequency between said input and said output field frequencies, said control means also operating said delay circuit to return said delay directly to said maximum value at the end of said time interval, the difference between said maximum and said minimum delay values being such that, at the end of said time interval, a small integral number of output fields is repeated in said output signal.

8. Apparatus for generating from an input television signal an output television signal having a higher field repetition frequency than said input signal, said apparatus comprising:

a variable delay circuit, connecting means, said connecting means feeding said input signal to said variable delay circuit, control means, said control means operating to decrease progressively the delay introduced by said delay circuit from a maximum to a minimum value during a time interval substantially equal to a small integral multiple of the period of the beat frequency between said input and said output field frequencies, said control means also operating said delay circuit to return said delay directly to said maximum value at the end of said time interval, said control means varying the delay introduced by said delay circuit in discrete units of delay each of which is substantially equal to a small integral multiple of the difference between an input and output field period, said control means operating said delay circuit to change said delay introduced by said delay circuit by one discrete delay unit at regular time intervals each of which is equal to a small integral multiple of one output field, the difference between said maximum and said minimum delay values being such that, at the end of said time interval during which said delay is varied from said maximum to said minimum value, a small integral number of output fields is repeated in said output signal.

9. Apparatus for generating from an input television signal an output television signal having a higher field repetition frequency than said input signal, said apparatus comprising:

a variable delay circuit, connecting means, said connecting means feeding said input signal to said variable delay circuit, and control means, said control means operating to decrease progressively the delay introduced by said delay circuit from a maximum to a minimum value during a time interval substantially equal to the period of the beat frequency between said input and said output field frequencies, said control means also operating said delay circuit to return said delay directly to said maximum value at the end of said time interval, said control means varying the delay introduced by said delay circuit in discrete units of delay each of which is substantially equal to the difference between an input and an output field period, said control means operating said delay circuit to change said delay introduced by said delay circuit by one discrete delay unit at regular time intervals each of which is equal to one output field period, the difference between said maximum and said minimum delay values of said delay circuit being equal to one input field period minus one discrete unit of delay.

10. Apparatus for generating from an input television signal an output television signal having a higher field repetition frequency than said input signal, said apparatus comprising:

a variable delay circuit, connecting means, said connecting means feeding said input signal to said variable delay circuit, and control means, said control means operating to decrease continuously the delay introduced by said delay circuit from a maximum to a minimum value during a time interval substantially equal to a small integral multiple of the period of the beat frequency between said input and said output field frequencies, said control means also operating said delay circuit to return said delay directly to said maximum value at the end of said time interval, the difference between said maximum and said minimum delay values being equal to a small integral multiple of one input field period.

11. Apparatus for generating from an input television signal an output television signal having a higher field repetition frequency than said input signal, said apparatus comprising:

a variable delay circuit, connecting means, said connecting means feeding said input signal to said variable delay circuit, and control means, said control means operating to decrease progressively the delay introduced by said delay circuit from a maximum to a minimum value during a time interval substantially equal to a small integral multiple of the period of beat frequency between said input and said output field frequencies, said control means also operating said delay circuit to return said delay directly to said maximum value at the end of said time interval, said control means varying the delay introduced by said delay circuit in discrete units of delay substantially equal to a small integral multiple of an input line period, said control means operating said delay circuit to change the delay introduced by said delay circuit by one discrete delay unit at regular time intervals so that there is discarded from the input signal a number of lines which are evenly distributed throughout each field of the input signal, the difference between said maximum and said minimum delay values being such that at the end of said time interval during which said delay is varied from said minimum to said maximum value, a small integral number of output fields is repeated in said output signal.

12. Apparatus for generating from an input television signal an output television signal having a higher field repetition frequency than said input signal, said apparatus comprising:

a variable delay circuit, connecting means, said connecting means feeding said input signal to said variable delay circuit, a number of delay elements have different fixed delay values, said delay elements constituting said variable delay circuit, and control means, said control means operating to decrease progressively the delay introduced by said delay circuit from a maximum to a minimum value during a time interval substantially equal to a small integral multiple of the period of the beat frequency between said input and said output field frequencies, said control means also operating said delay circuit to return said delay directly to said maximum value at the end of said time interval, said control means varying the delay introduced by said delay circuit in discrete units of delay substantially equal to a small integral multiple of an input line period, said control means operating said delay circuit to change the delay introduced by said delay circuit by one discrete delay unit at regular time intervals so that there is discarded from the input signal a number of lines which are evenly distributed throughout each field of the input signal, the lowest of said fixed delay values of said delay elements being equal to said discrete delay unit, the other fixed delay values being equal to multiples of the lowest value with increasing integral powers of the number 2, said control means varying the delay introduced by the delay circuit in said discrete delay units by feeding the input signal through different combinations of the delay elements, the difference between said maximum and said minimum delay values being such that, at the end of said time interval during which said delay is varied from said maximum to said minimum value, a small integral number of output fields is repeated in said output signal.

13. Apparatus for generating from an input television signal an output television signal having a lower line repetition frequency than said input signal, said apparatus comprising:

a variable delay circuit, connecting means, said connecting means feeding said input signal to said variable delay circuit, and control means, said control means operating to increase progressively the delay introduced by said delay circuit from a minimum to a maximum value during a time interval substantially equal to a small integral multiple of the period of the beat frequency between said input and said output line frequencies, said control means also operating said delay circuit to return said delay directly to said minimum value at the end of said time interval, the difference between said maximum and said minimum delay values being such that, at the end of said time interval, a small integral number of input lines is discarded from said input signal.

14. Apparatus for generating from an input television signal an output television signal having a lower line repetition frequency than said input signal, said apparatus comprising:

a variable delay circuit, connecting means, said connecting means feeding said input signal to said variable delay circuit, and control means, said control means operating to increase progressively the delay introduced by said delay circuit from a minimum to a maximum value during a time interval substantially equal to a small integral multiple of the period of the beat frequency between said input and said output line frequencies, said control means also operating said delay circuit to return said delay directly ot said minimum value at the end of said time interval, said control means varying the delay introduced by said delay circuit in discrete units of delay each of which is substantially equal to a small integral multiple of the difference between an input and output line period, said control means operating said delay circuit to change said delay introduced by said delay circuit by one discrete delay unit at regular time intervals each of which is equal to a small integral multiple of one output line period, the difference between said maximum and said minimum delay values being such that, at the end of said time interval during which said delay is varied from said minimum to said maximum value, a small integral number of input lines is discarded from said input signal.

15. Apparatus for generating from an input television signal an output television signal having a lower line repetition frequency than said input signal, said apparatus comprising:

a variable delay circuit, connecting means, said connecting means feeding said input signal to said variable delay circuit, and control means, said control means operating to increase progressively the delay introduced by said delay circuit from a minimum to a maximum value during a time interval substantially equal to the period of the beat frequency between said input and said output line frequencies, said control means also operating said delay circuit to return said delay directly to said minimum value at the end of said time interval, said control means varying the delay introduced by said delay circuit in discrete units of delay each of which is substantially equal to the difference between an input and output line period, said control means operating said delay circuit to change said delay introduced by said delay circuit by one discrete delay unit at regular time intervals each of which is equal to one output line period, the difference between said maximum and said minimum delay values of the delay circuit being equal to one input line period minus one discrete unit of delay.

16. Apparatus for generating from an input television signal an output television signal having a lower line repetition frequency than said input signal, said apparatus comprising:

a variable delay circuit, connecting means, said connecting means feeding said input signal to said variable delay circuit, and control means, said control means operating to increase continuously the delay introduced by said delay circuit from a minimum to a maximum value during a time interval substantially equal to a small integral multiple of the period of the beat frequency between said input and said output line frequencies, said control means also operating said delay circuit to return said delay directly to said minimum value at the end of said time interval, the difference between said maximum and said minimum delay values being equal to a small integral multiple of one input line period.

17. Apparatus for generating from an input television signal an output television signal having a lower line repetition frequency than said input signal, said apparatus comprising:

a variable delay circuit, connecting means, said connecting means feeding said input signal to said variable delay circuit, and control means, said control means operating to increase progressively the delay introduced by said delay circuit from a minimum to a maximum value during a time interval substantially equal to a small integral multiple of the period of the beat frequency between said input and said output line frequencies, said control means also operating said delay circuit to return said delay to said minimum value at the end of said time interval, said control means varying the delay introduced by said delay circuit in discrete delay units substantially equal to a small integral multiple of a fraction of a picture element, the fraction being equal to the difference between the input and output line periods divided by the input line period, said control means operating said delay circuit to change said delay introduced by said delay circuit by one discrete delay unit at regular time intervals, so that there is discarded from the input signal a number of picture elements which are evenly distributed throughout each line of the input signal, the difference between said maximum and said minimum delay values being such that, at the end of said time interval during which said delay is varied from said minimum to said maximum value, a small integral number of input lines is discarded from said input signal.

18. Apparatus for generating from an input television signal an output television signal having a lower line repetition frequency than said input signal, said apparatus comprising:

a variable delay circuit, connecting means, said connecting means feeding said input signal to said variable delay circuit, a number of delay elements having different fixed delay values, said delay elements constituting said variable delay circuit, and control means, said control means operating to increase progressively the delay introduced by said delay circuit from a minimum to a maximum value during a time interval substantially equal to a small integral multiple of the period of the beat frequency between said input and said output line frequencies, said control means also operating said delay circuit to return said delay directly to said minimum value at the end of said time interval, said control means varying the delay introduced by said delay circuit in discrete delay units substantially equal to a small integral multiple of a fraction of a picture element, the fraction being equal to the difference between the input and output line periods divided by the input line period, said control means operating said delay circuit to change said delay introduced by said delay circuit by one discrete delay unit at regular time intervals, so that there is discarded from the input signal a number of picture elements which are evenly distributed throughout each line of the input signal, the lowest of said fixed delay values being equal to said discrete delay unit, and the other fixed delay values being equal to multiples of the lowest value with increasing integral powers of the number 2, said control means varying the delay introduced by said delay circuit in the said discrete delay units by feeding the input signal through different combinations of the delay elements, the difference between said maximum and said minimum delay values being such that, at the end of said time interval during which said delay is varied from said minimum to said maximum value, a small integral number of input lines is discarded from said input signal.

19. Apparatus for generating from an input television signal an output television signal having a higher line repetition frequency than said input signal, said apparatus comprising:

a variable delay circuit, connecting means, said connecting means feeding said input signal to said variable delay circuit, and control means, said control means operating to decrease progressively the delay introduced by said delay circuit from a maximum to a minimum value during a time interval substantially equal to a small integral multiple of the period of the beat frequency between said input and said output line frequencies, said control means also operating said delay circuit to return said delay directly to said maximum value at the end of said time interval, the difference between said maximum and said minimum delay values being such that, at the end of said time interval, a small integral number of output lines is repeated in said output signal.

20. Apparatus for generating from an input television signal an output television signal having a higher line repetition frequency than said input signal, said apparatus comprising:

a variable delay circuit, connecting means, said connecting means feeding said input signal to said variable delay circuit, and control means, said control means operating to decrease progressively the delay introduced by said delay circuit from a maximum to a minimum value during a time interval substantially equal to a small integral multiple of the period of the beat frequency between said input and said output line frequencies, said control means also operating said delay circuit to return said delay directly to said maximum value at the end of said time interval, said control means varying the delay introduced by said delay circuit in discrete units of delay each of which is substantially equal to a small integral multiple of the difference between an input and output line period, said control means operating said delay circuit to change said delay introduced by said delay circuit by one discrete delay unit at regular time intervals each of which is equal to a small integral multiple of one output line period, the difference between said maximum and said minimum delay values being such that, at the end of said time interval during which said delay is varied from said maximum to said minimum value, a small integral number of output lines is repeated in said output signal.

21. Apparatus for generating from an input television signal an output television signal having a higher line repetition frequency than said input signal, said apparatus comprising:

a variable delay circuit, connecting means, said connecting means feeding said input signal to said variable delay circuit, and control means, said control means operating to decrease progressively the delay introduced by said delay circuit, from a maximum to a minimum value during a time interval substantially equal to the period of the beat frequency between said input and said output line frequencies, said control means also operating said delay circuit to return said delay directly to said maximum value at the end of said time interval, said control means varying the delay introduced by said delay circuit in discrete units of delay each of which is substantially equal to the difference between an input and output line period, said control means operating said delay circuit to change said delay introduced by said delay circuit by one discrete unit at regular time intervals each of which is equal to one output line period, the difference between said maximum and said minimum delay values of the delay circuit being equal to one input line period minus one discrete unit of delay.

22. Apparatus for generating from an input television signal an output television signal having a higher line repetition frequency than said input signal, said apparatus comprising:

a variable delay circuit, connecting means, said connecting means feeding said input signal to said variable delay circuit, and control means, said control means operating to decrease continuously the delay introduced by said delay circuit from a maximum to a minimum value during a time interval substantially equal to a small integral multiple of the period of the beat frequency between said input and said output line frequencies, said control means also operating said delay circuit to return said delay directly to said maximum value at the end of said time interval, the difference between said maximum and said minimum delay values of the delay circuit being equal to a small integral multiple of one input line period.

23. Apparatus for generating from an input television signal an output television signal having a higher line repetition frequency than said input signal, said apparatus comprising:

a variable delay circuit, connecting means, said connecting means feeding said input signal to said variable delay circuit, and control means, said control means operating to decrease progressively the delay introduced by said delay circuit from a maximum to a minimum value during a time interval substantially equal to a small integral multiple of the period of the beat frequency between said input and said output line frequencies, said control means also operating said delay circuit to return said delay directly to said maximum value at the end of said time interval, said varying means varying the delay introduced by said delay circuit in discrete delay units substantially equal to a small integral multiple of a fraction of a picture element, the fraction being equal to the difference between the input and output line periods divided by the input line period, said control means operating said delay circuit to change said delay introduced by said delay circuit by one discrete delay unit at regular time intervals, so that there is repeated in the output signal a number of picture elements which are evenly distributed throughout each line of the output signal, the difference between said maximum and said minimum delay values being such that, at the end of said time interval during which said delay is varied from said maximum to said minimum value, a small integral number of output lines is repeated in said output signal.

24. Apparatus for generating from an input television signal an output television signal having a higher line repetition frequency than said input signal, said apparatus comprising:

a variable delay circuit, connecting means, said connecting means feeding said input signal to said variable delay circuit, a number of delay elements having different fixed delay values, said delay elements constituting said variable delay circuit, and control means, said control means operating to decrease progressively the delay introduced by said delay circuit from a maximum to a minimum value during a time interval substantially equal to a small integral multiple of the period of the beat frequency between said input and said output line frequencies, said control means also operating said delay circuit to return said delay directly to said maximum value at the end of said time interval, said control means varying the delay introduced by said delay circuit in discrete delay units substantially equal to a small integral multiple of a fraction of a picture element, the fraction being equal to the difference between the input and output line periods divided by the input line period, said control means operating said delay circuit to change said delay introduced by said delay circuit by one discrete delay unit at regular time intervals so that there is repeated in the output signal a number of picture elements which are evenly distributed throughout each line of the output signal, the lowest of said fixed delay values being equal to said discrete delay unit, and the other fixed delay values being equal to multiples of the lowest value with increasing integral powers of the number 2, said control means varying the delay introduced by said delay circuit in said discrete delay units by feeding input signal through different combinations of said delay elements, the difference between said maximum and said minimum delay values being such that, at the end of said time interval during which said delay is varied from said minimum to said maximum value, a small integral number of output lines is repeated in said output signal.

25. Apparatus for generating from an input television signal an output television signal having a lower line and a lower field repetition frequency than said input signal, said apparatus comprising:

a variable delay circuit, conecting means, said connecting means feeding said input signal to said variable delay circuit, and control means, said control means operating to increase progressively the delay introduced by said delay circuit from a minimum to a maximum value during a time interval substantially equal to a small integral multiple of the period of the beat frequency between said input and said output field frequencies, said control means also operating said delay circuit to return said delay directly to said minimum value at the end of said time interval, said control means varying the delay introduced by said delay circuit in discrete delay units substantially equal to the difference between an input and as output line periods, said control means operating said delay circuit to change said delay introduced by said delay circuit by one discrete delay unit at regular time intervals equal to one output line period, the difference between said maximum and said minimum delay values being such that, at the end of said time interval during which said delay is varied from said minimum to said maximum value, a small integral number of input fields is discarded from said input signal.

26. Apparatus for generating from an input television signal an output television signal having a higher line and a high field repetition frequency than said input signal, said apparatus comprising:

a variable delay circuit, connecting means, said connecting means feeding said input signal to said variable delay circuit, and control means, said control means operating to decrease progressively the delay introduced by said delay circuit from a maximum to a minimum value, during a time interval substantially equal to a small integral multiple of the period of the beat frequency between said input and said output field frequencies, said control means also actuating said varying means to return said delay directly to said maximum value at the end of said time interval, said control means varying the delay introduced by said delay circuit in discrete delay units substantially equal to the difference between an input and an output line period, said control means operating said delay circuit to change said delay introduced by said delay circuit by one discrete delay unit at regular time intervals equal to one output line period, the difference between said maximum and said minimum delay values being such that, at the end of said time interval during which said delay is varied from said maximum to said minimum value, a small integral number of output fields is repeated in said output signal.

References Cited

UNITED STATES PATENTS

| | | | |
|---|---|---|---|
| 2,813,148 | 11/1957 | Pensak | 178—6.8 |
| 3,109,892 | 11/1963 | Helsdon | 178—6.8 |
| 3,277,381 | 10/1966 | Sullivan | 328—56 |
| 3,293,552 | 12/1966 | Sichak | 328—55 |
| 3,324,251 | 6/1967 | Sichak | 333—29 |

ROBERT L. GRIFFIN, *Primary Examiner.*

J. A. ORSINO, *Assistant Examiner.*